(12) United States Patent
Kaneko et al.

(10) Patent No.: US 6,836,393 B2
(45) Date of Patent: Dec. 28, 2004

(54) RESONANCE TYPE POWER SUPPLY UNIT

(75) Inventors: Susumu Kaneko, Miyagi (JP); Katsumi Kobori, Miyagi (JP)

(73) Assignee: Sony Corporation, Tokyo (JP)

( * ) Notice: Subject to any disclaimer, the term of this patent is extended or adjusted under 35 U.S.C. 154(b) by 364 days.

(21) Appl. No.: 10/093,113

(22) Filed: Mar. 7, 2002

(65) Prior Publication Data

US 2002/0149890 A1 Oct. 17, 2002

(30) Foreign Application Priority Data

Mar. 9, 2001 (JP) ........................................ 2001-067455

(51) Int. Cl.$^7$ ............................................. H02H 7/00
(52) U.S. Cl. ............................ 361/18; 361/90; 361/113
(58) Field of Search ............................. 361/18, 23, 24, 361/38, 58, 90, 93.1, 100, 113

(56) References Cited

U.S. PATENT DOCUMENTS 5,488,552 A * 1/1996 Sakamoto et al. ............ 363/97
5,781,418 A * 7/1998 Chang et al. ................. 363/16
5,914,870 A * 6/1999 Noble et al. .................. 363/84

* cited by examiner

Primary Examiner—Stephen W. Jackson
(74) Attorney, Agent, or Firm—Frommer Lawrence & Haug LLP; William S. Frommer

(57) ABSTRACT

A power supply unit designed to control a power output and protect an overload easily, economically with little loss. A DC output which is generated by smoothing a rectified current of a rectifier circuit connected to an AC power source is subjected to switching by a switching circuit, creating an AC output which is supplied to a current resonance circuit. A peak detection circuit detects the peak voltage of a resonance voltage of this current resonance circuit. On the basis of a comparison output of the voltage comparator comparing the peak voltage to the reference voltage of a reference voltage source, the switching frequency of the switching circuit is controlled by a switching control circuit so that it is controlled to cause the peak voltage to match the reference voltage. In this manner, the output power is maintained on the constant level.

12 Claims, 11 Drawing Sheets

RESONANCE TYPE POWER SUPPLY UNIT

CROSS REFERENCES TO RELATED APPLICATIONS

The present document is based on Japanese Priority Document JP 2001-067455, filed in the Japanese Patent Office on Mar. 9, 2001, the entire contents of which being incorporated herein by reference.

BACKGROUND OF THE INVENTION

1. Field of the Invention

The present invention relates to a resonance type power supply unit, with a switching circuit having an inductive element and a capacitive element, which causes a current waveform or a voltage waveform to resonate.

2. Description of the Related Art

Conventionally, there have been widely in use a power source unit of a inverter type which switches a direct current obtained by rectifying and smoothing a commercial alternating current and outputs an alternating current and a switching power source designed to convert an inverter output with high efficiency to the desired voltage by means of a transformer. In a power supply unit using the power source of the inverter type or the switching power source as those described above, an output power control is performed by any of the methods such as a pulse width modulation (PWM) method for detecting the output voltage and current, providing the power by multiplying the values obtained with the integrator, and controlling the duty factor of the switching pulse; a frequency control method which controls the frequency and phase of the switching pulse, and a phase control method.

Also, overcurrent protection is typically used as the conventional means of protecting the power supply unit. The current has been detected by a detection resistance, a current transformer, a Hall element or the like.

Further, as a conventional method for suppressing output variation due to voltage variation in a power source, as disclosed in Japanese Patent Application Publication Hei 9-120221, for example, there has been proposed a method of controlling an output of a high-frequency power circuit in proportion to a difference from a second reference voltage which changes proportionally to the power voltage supplied to the above-mentioned high-frequency power circuit.

When the power control of output and overcurrent protection are performed in the conventional power supply unit, a detection resistance is typically used for current detection, so that in a case of a large current, a loss necessarily becomes large. Also, the control circuit for power control calls for a complicated configuration, thus increasing the number of parts and giving rise to such problems as a resultant decrease in reliability and a cost increase. Further, if the arrangements are made to detect a current with a current transformer, a Hall element, or the like, an increase in cost cannot be avoided.

SUMMARY OF THE INVENTION

In view of the foregoing conventional problems, the present invention provides a resonance type power supply unit which can perform power control of output and overload protection easily at low cost and at low loss.

According to the present invention, there is provided a resonance type power supply unit having an inductive element and a capacitive element in its switching circuit and causing a current waveform or a voltage waveform to resonate. The unit comprises a resonance voltage detector for detecting a resonance voltage by the inductive element and the capacitive element, a voltage converter for converting the resonance voltage detected by the resonance voltage detector to a comparable DC voltage, a voltage comparator for comparing a DC voltage obtained by the voltage converter to a reference voltage, and a switching controller for controlling a switching frequency or an on-state time interval of the switching circuit to cause the DC voltage to correspond to the reference voltage based on an comparison output by the voltage comparator.

As apparent from the foregoing, in the resonance type power supply unit according to the present invention having an inductive element and a capacitive element in its switching circuit and causing a current waveform or a voltage waveform to resonate, it is possible to control the output power at the constant level by controlling the switching frequency or the on-state time interval of the switching circuit so that the resonance voltage due to the inductive element and capacitive element may reach the preset voltage.

Also, in the resonance type power supply unit according to the present invention, the output power can be easily controlled by changing the reference voltage which provides the above-mentioned preset voltage.

Further, in the resonance type power supply unit according to the present invention, soft start control and soft stop control for protection of the constituent elements as well as anti-flickering measures of the AC line can be easily accomplished by increasing the reference voltage gradually to the preset value at the time of the start control, decreasing the reference voltage gradually to the preset value at the time of the stop control, and stopping the switching of the switching circuit.

Furthermore, in the resonance type power supply unit according to the present invention, since the resonance voltage of the inductive element and capacitive element reaches a point approximately in proportion to the output power, the overload protection measure can be easily applied by detecting the resonance voltage.

Therefore, according to the present invention, it is possible to provide the resonance type power supply unit which can perform the power control of output and overload protection easily at a low cost and at low loss.

BRIEF DESCRIPTION OF THE DRAWINGS

The invention disclosed herein will be understood better with reference to the following drawings of which.

DETAILED DESCRIPTION OF THE PREFERRED EMBODIMENTS

Preferred embodiments of the present invention will be described in detail with reference to the accompanying drawings.

First Embodiment

Figure 1:
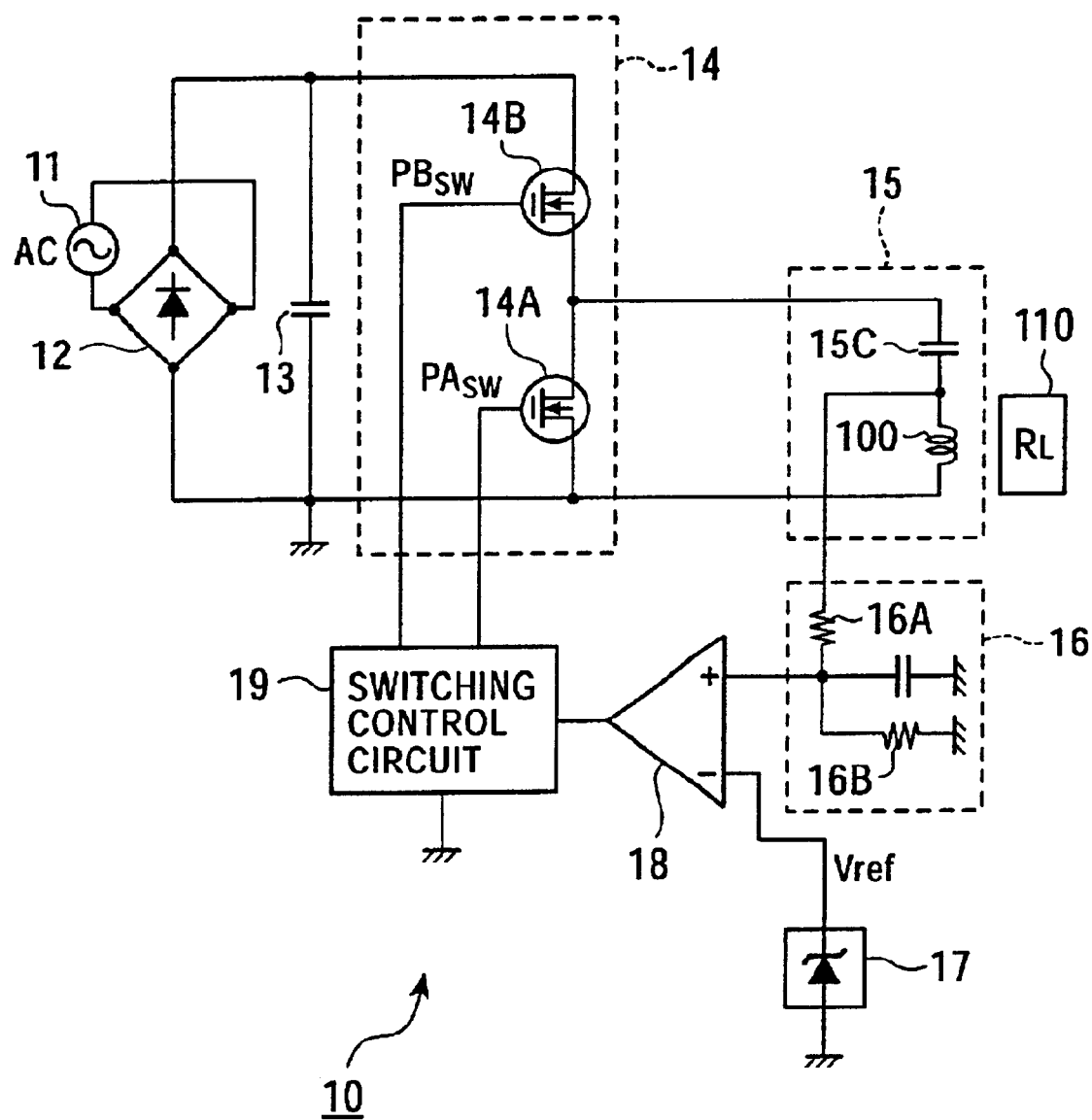
FIG. 1 is a block circuit diagram showing a configuration of a current resonance type power supply unit according to the present invention.

Referring to FIG. 1, there is shown a block circuit diagram of a current resonance type power supply unit 10 provided with an induction heating device, to which the present invention has been applied, and which generates heat as a high frequency current is run into an induction heating coil 100 to give rise to an inductive current and heat in a body to be heated 110, which is placed in close proximity to the induction heating coil 100.

The current resonance type power supply unit 10 according to a first embodiment of the present invention includes a rectifying circuit 12, a smoothing capacitor 13, a switching circuit 14, a current resonance circuit 15, a resistance split circuit 16, a voltage comparator 18, a switching control circuit 19 and the like. The rectifying circuit 12 is connected to an AC power source 11. The smoothing capacitor 13 smoothes a rectified output of the rectifying circuit 12. The switching circuit 14 switches a DC output obtained by smoothing the rectified output of the rectifying circuit 12 in the smoothing capacitor 13. The current resonance circuit 15 to which an AC output obtained by the switching circuit 14 is supplied. The resistance split circuit 16 divides a resonance voltage Vlo of the current resonance circuit 15. The voltage comparator 18 compares an output voltage Vdv of the resistance split circuit 16 to a reference voltage Vref given by a reference voltage source 17. The switching control circuit 19 controls a switching frequency or an on-state time interval of the switching circuit 14 based on a comparison output of the voltage comparator.

The switching circuit 14 comprises two switching elements 14A and 14B connected in series between the both ends of the smoothing capacitor 13. These two switching elements 14A and 14B constituting the switching circuit 4 perform a switching operation complementarily as controlled by the switching control circuit 19.

The current resonance circuit 15 is formed of serial connection of a resonant capacitor 15C to the induction heating coil 100, being connected in parallel to the switching element 14A thereof.

The resistance split circuit 16 comprises resistances 16A and 16B connected in series between a connection point of the resonant capacitor 15C and the induction heating coil 100 and the ground. The resistance split circuit 16 supplies the voltage comparator 18 an output voltage Vdv produced by subjecting the resonance voltage Vlo, which is obtained at the connection point between the resonant capacitor 15C and the induction heating coil 100, to resistance split.

The switching control circuit 19 controls the switching frequency of the switching circuit 14 so that the output voltage Vdv of the resistance split circuit 16 may correspond to the reference voltage Vref based on the comparison output by the voltage comparator 18.

Figure 2:
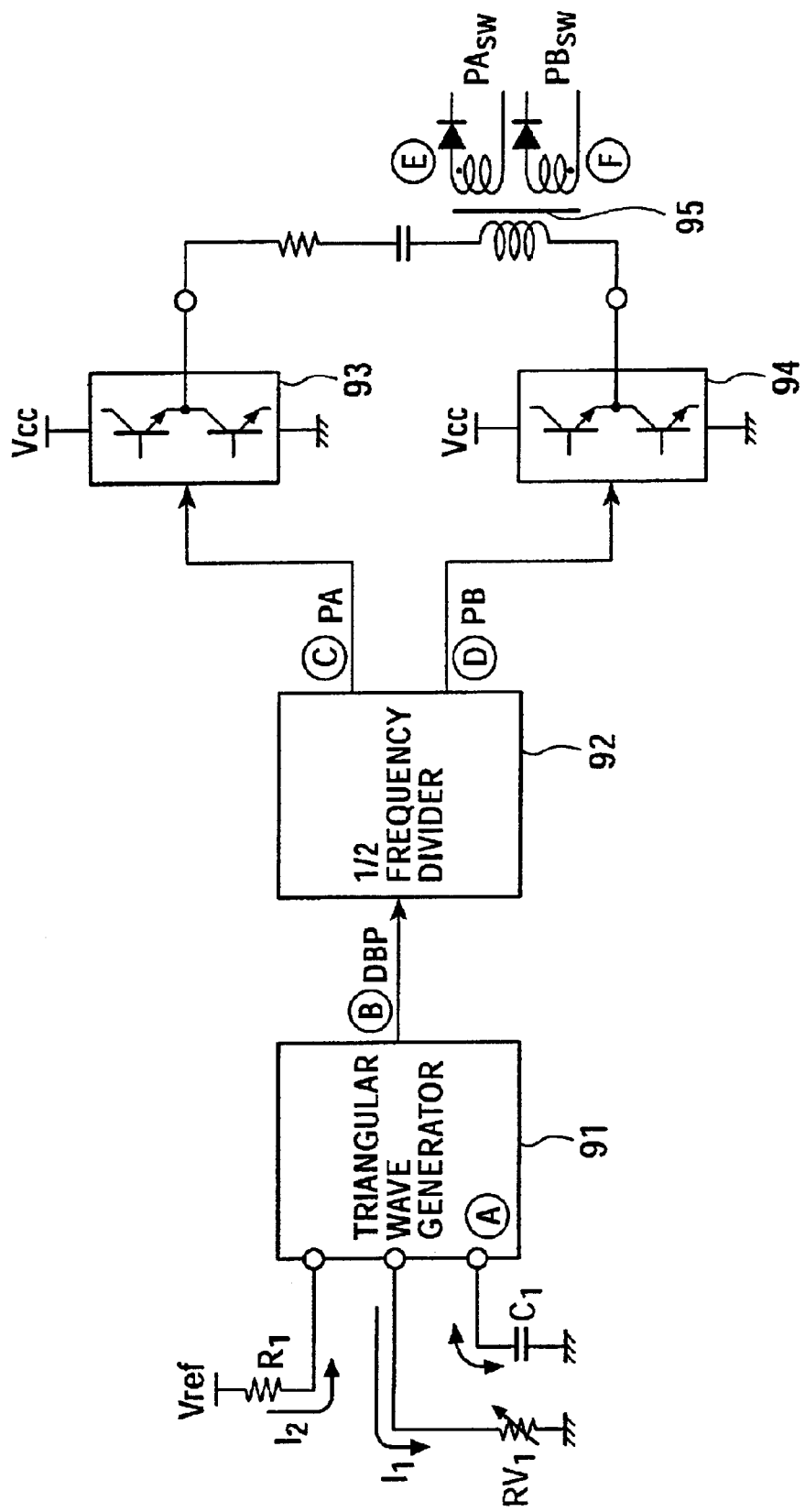
FIG. 2 is a block circuit diagram showing a configuration of a switching control circuit in the current resonance type power supply unit.
Figure 3:
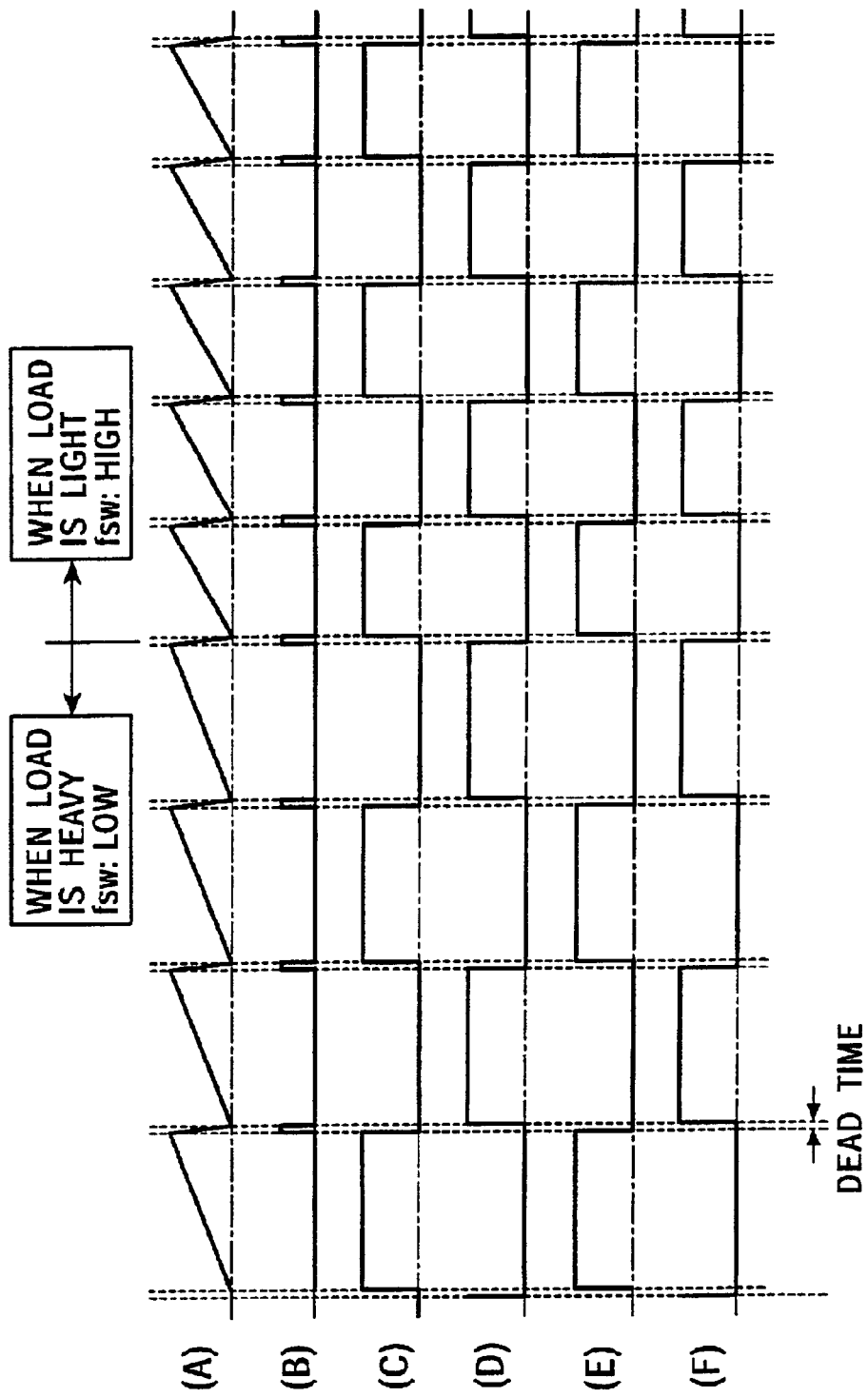
FIG. 3 is a waveform diagram showing operation of the switching control circuit.

The switching control circuit 19 is constituted, for example, as shown in FIG. 2. The switching control circuit 19 is provided with a triangular wave generator 91 which controls an oscillation frequency fsw by a resistance $RV_1$ wherein the resistance value changes according to the comparison output of the voltage comparator 18, whereas a dead band pulse DBP as shown in 3(B) is generated by the triangular wave generator 91 on the basis of a triangular wave SW as shown in FIG. 3(A), and by dividing the dead band pulse DBP by ½ with a ½ frequency divider 92, square wave pulses PA and PB as shown in FIG. 3(C) and FIG. 3(D) are formed, whereupon, by complementarily driving totem pole drivers 93 and 94 with these square wave pulses PA and PB, switching control pulses PAsw and PBsw as shown in FIG. 3(E) and FIG. 3(F) are outputted via a drive transformer 95.

In the triangular wave generator 91, a charging current of a capacitor $C_1$ changes by the value of a resistance $RV_1$ subject to variable control by the comparison output of the voltage comparator 18, then the oscillation frequency fsw changes. The climbing grade of the triangular wave changes together with the oscillation frequency fsw.

When the value of the resistance $RV_1$ is small, the oscillation frequency fsw becomes high, and when the value of the resistance RV1 is large, the oscillation frequency fsw becomes low.

Also, depending on the value of the resistance $R_1$, the discharge current of the capacitor C1 is determined, and the descending grade of the triangular wave is approximately constant regardless of the oscillation frequency fsw.

Figure 4:
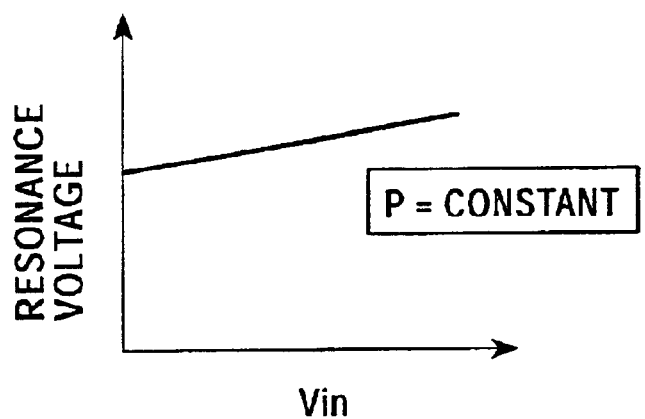
FIG. 4 is a diagram showing the relationship between a resonance voltage and an input voltage obtained in a current resonance circuit in the current resonance type power supply unit.
Figure 5:
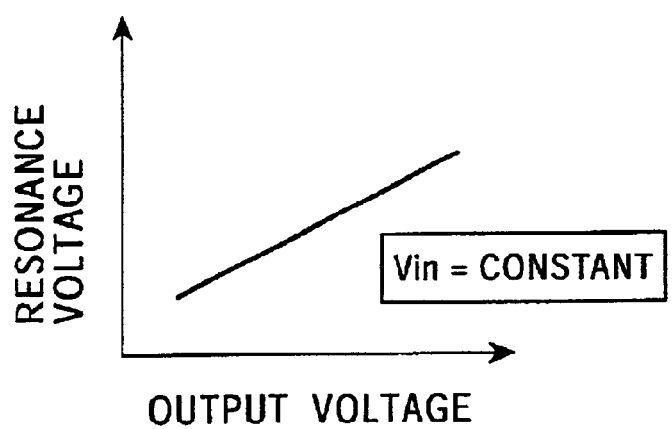
FIG. 5 is a diagram showing the relationship between a resonance voltage and an output voltage obtained in the current resonance circuit in the current resonance type power supply unit.

In the current resonance type power supply unit 10 of the configuration described above, the resonance voltage Vlo obtained at the connection point between the resonant capacitor 15C and the induction heating coil 100 constituting the current resonance circuit 15, takes an approximately constant value as shown in FIG. 4, when an output power P is set constant, regardless of the input voltage Vin. In addition, as shown in FIG. 5, when the input voltage Vin is set constant, the resonance voltage Vlo becomes approximately proportional to the output power P.

In this instance, the output power P is controlled at the constant level by controlling the switching frequency of the switching circuit 14 by means of the switching control circuit 19 so that an output voltage Vdv of the resistance split circuit 16 for dividing the resonance voltage Vlo, which is obtained at the connection point between the resonant capacitor 15C and the induction heating coil 100, may correspond to the reference voltage Vref.

Second Embodiment

Figure 6:
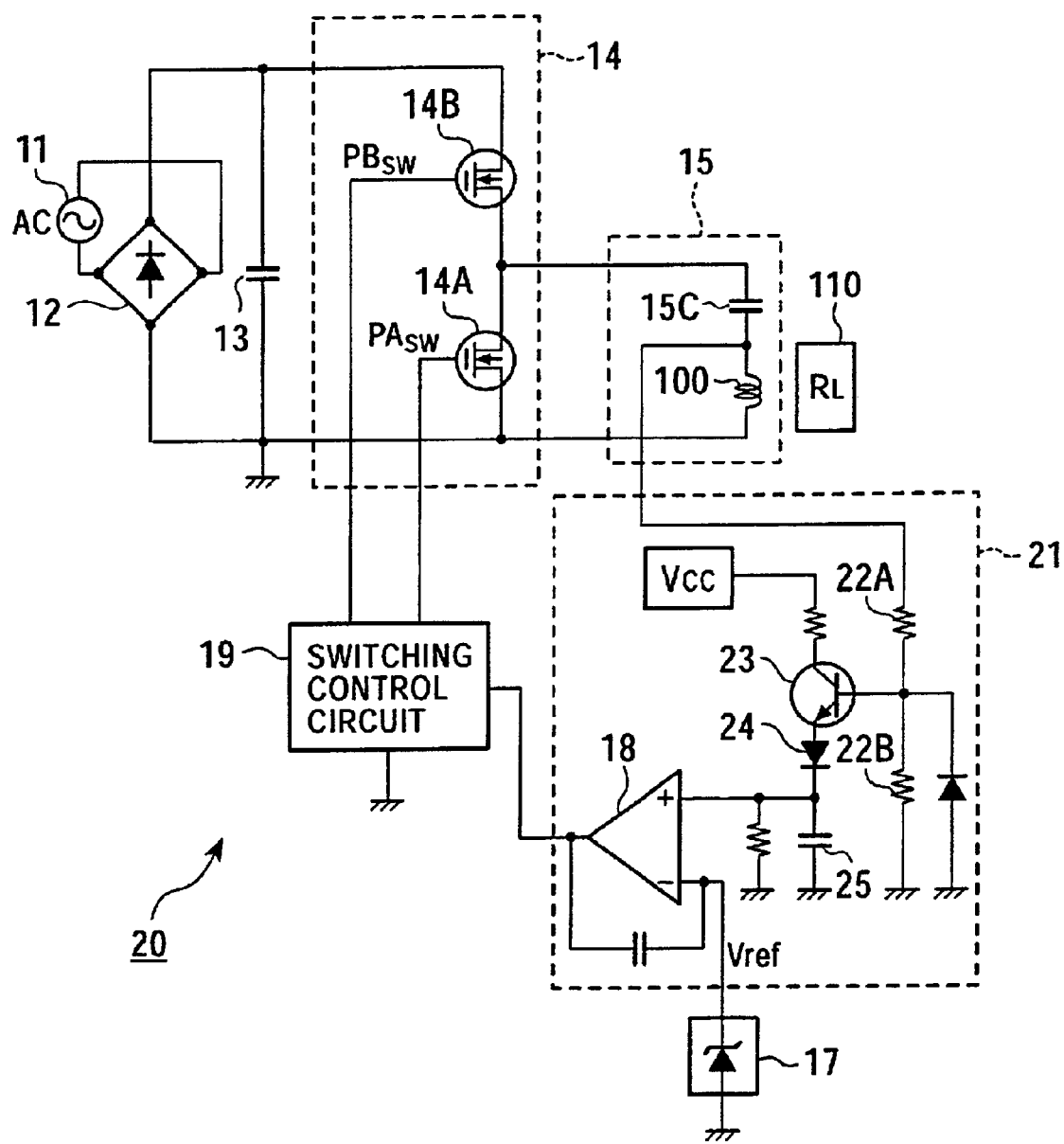
FIG. 6 is a block circuit diagram showing another configuration of the current resonance type power supply unit according to the present invention.

However, referring now to FIG. 6, there is shown a modified method of controlling the output voltage constant in the current resonance type power supply unit 20 according to a second embodiment. In lieu of the resistance split circuit 16, there is set up a peak detection circuit 21 for detecting a peak voltage Vpk of the resonance voltage Vlo obtained at the connection point between the resonant capacitor 15C and the induction heating coil 100, whereas the output power can be controlled at the constant level by controlling the switching frequency of the switching circuit 14 by means of the switching control circuit 19 so that the peak voltage Vpk detected by the peak detection circuit 21 may correspond to the reference voltage Vref.

It is to be noted that in the current resonance type power supply unit 20 according to a second embodiment which is shown in the block circuit diagram of FIG. 6, the same elements of configuration as the current resonance type power supply unit 10 shown in FIG. 1 described above are given the same reference characters in FIG. 6, the detailed explanation of the reference characters being omitted.

The peak detection circuit 21 in the current resonance type power supply unit 20 has a simplified peak hold circuit comprising a transistor 23, a diode 24 and a capacitor 25. The transistor 23 receives, at a base thereof, the resonance voltage Vlo obtained at the connection point between the resonant capacitor 15C and the induction heating coil 100 and potential-divided by resistances 22A and 22B. The diode 24 and the capacitor 25 are connected in series between the transistor 23 and the ground.

Figure 7:
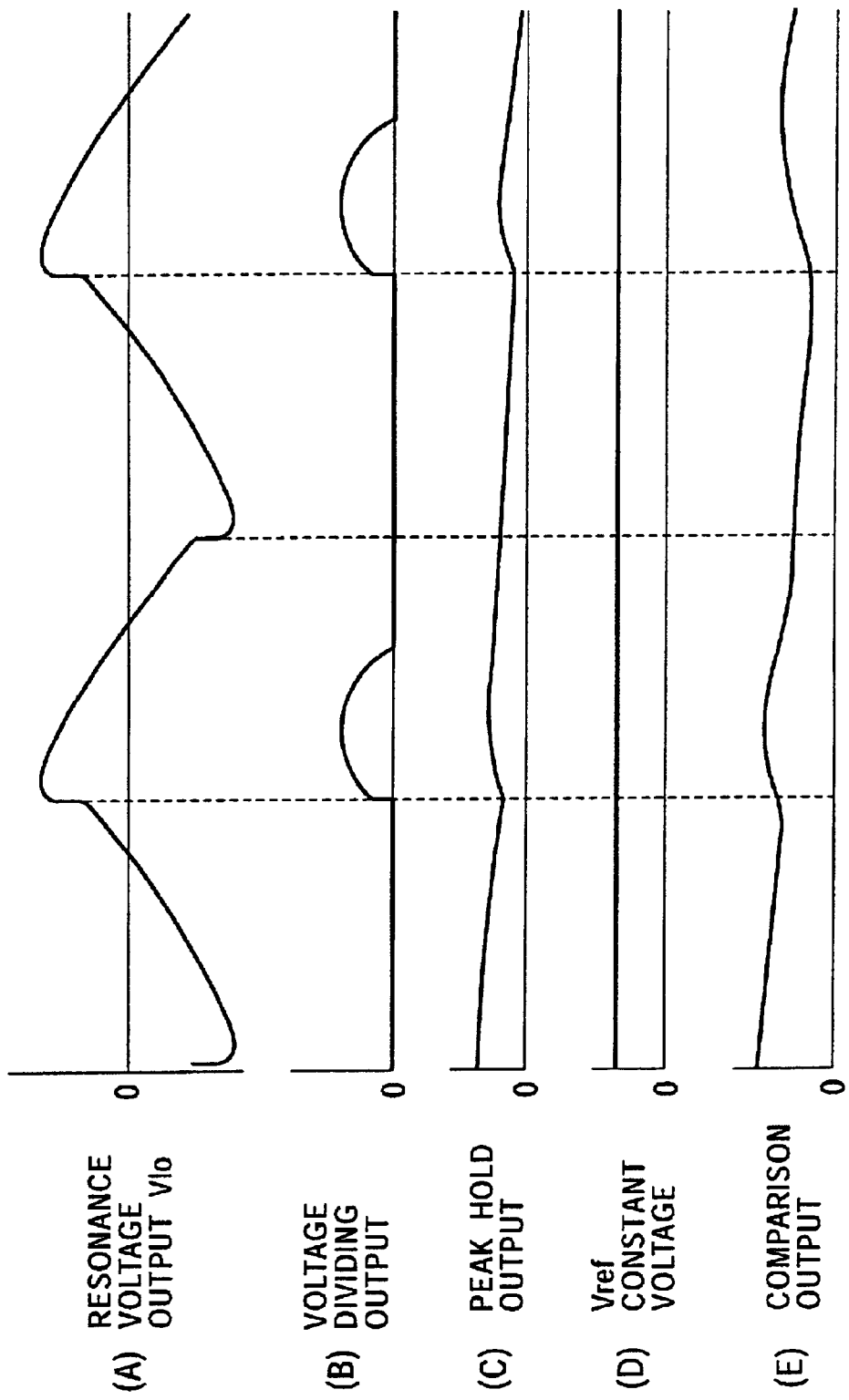
FIG. 7 is a waveform diagram showing operation of a peak detection circuit in the current resonance type power supply unit.

The peak detection circuit 21 supplies a peak hold output as shown in FIG. 7(C) to the other input end of the voltage comparator 18, the peak hold output being obtained by peak-holding a potential-dividing output of a waveform as shown in FIG. 7(B) which is obtained by dividing the resonance voltage Vlo as shown in FIG. 7(A) being obtained at the connection point between the resonant capacitor 15C and the induction heating coil 100.

In the voltage comparator 18, the comparison output (actually, approximately on the DC level) as shown in FIG. 7(E) is supplied to the switching circuit 19 by comparing the peak voltage Vpk of the resonance voltage Vlo detected as the peak-hold output to the reference voltage Vref as shown in FIG. 7(D).

In the current resonance type power supply unit 10 and the current resonance type power supply unit 20 of the above-mentioned configuration, since the resonance voltage Vlo obtained at the connection point between the resonant capacitor 15C and the induction heating coil 100 which constitutes the current resonance circuit 15 takes up values approximately proportional to the output power P, the reference voltage source 17 can be set as a variable voltage source so that the output power can be varied by changing the reference voltage Vref to cause the resonance voltage Vlo to vary.

Third Embodiment

Figure 8:
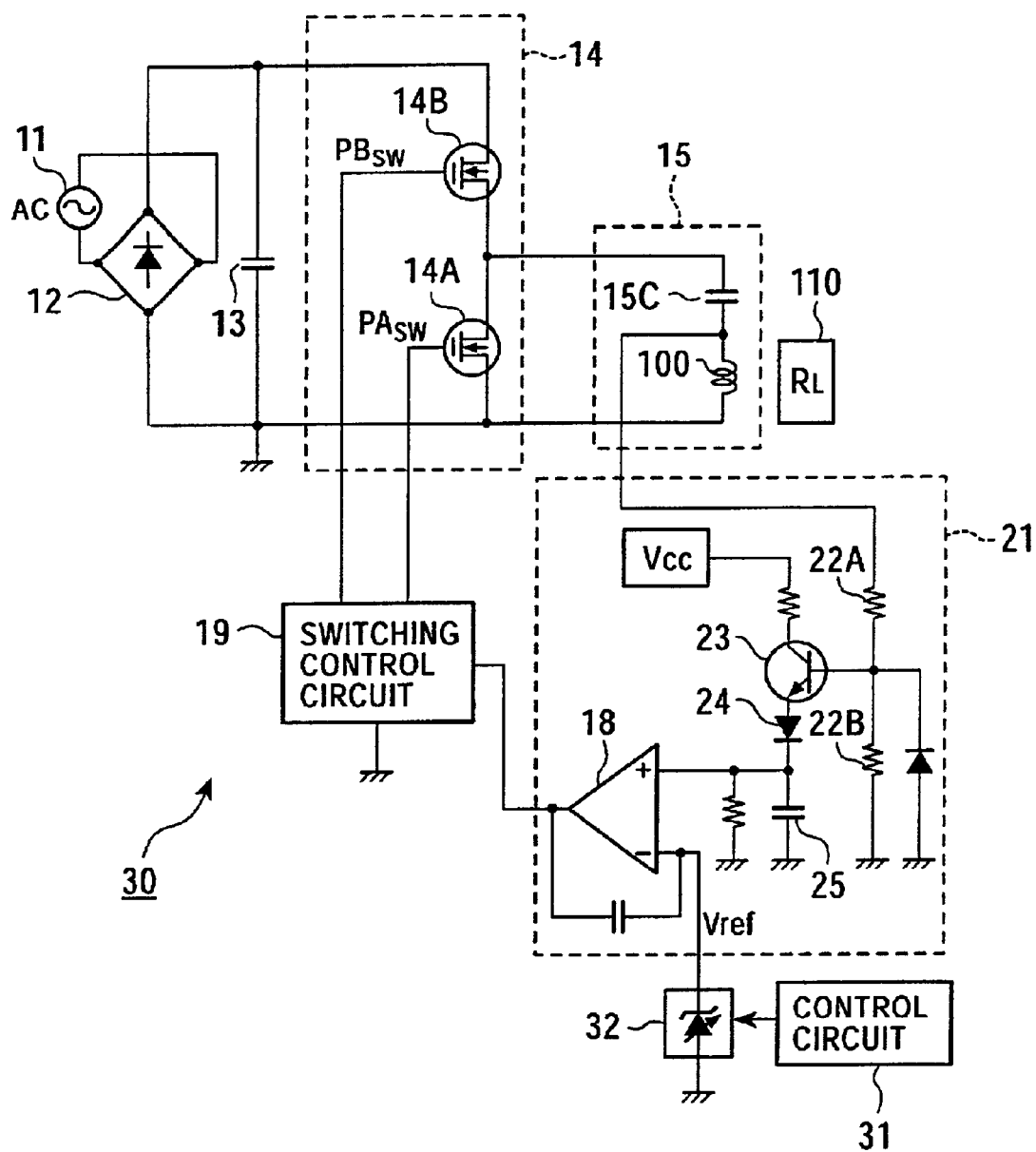
FIG. 8 is a block circuit diagram showing another configuration of the current resonance type power supply unit according to the present invention.

Referring now to a block circuit diagram of FIG. 8, there is shown a current resonance type power supply unit 30 according to a third embodiment. A unit is modified so as to make it possible to vary the output power of the current resonance type power supply unit 20 shown in FIG. 6. In the unit 30, the reference voltage Vref is provided to the voltage comparator 18 by means of a variable reference voltage source 32 made controllable by control signals from a control circuit 31.

It is to be noted that in the current resonance type power supply unit 30 shown in the block circuit diagram of FIG. 8, the same elements of configuration as the current resonance type power supply unit 20 shown in FIG. 6 described above are given the same reference characters in FIG. 8, the detailed explanation of the reference characters being omitted.

In the current resonance type power supply unit 30, through control of the variable reference voltage source 32 by control signals from the control circuit 31, the reference voltage Vref given to the voltage comparator 18 by the variable reference voltage source 32 is varied to change the above-mentioned resonance voltage Vlo, thereby making it possible to vary the output power.

Figure 9:
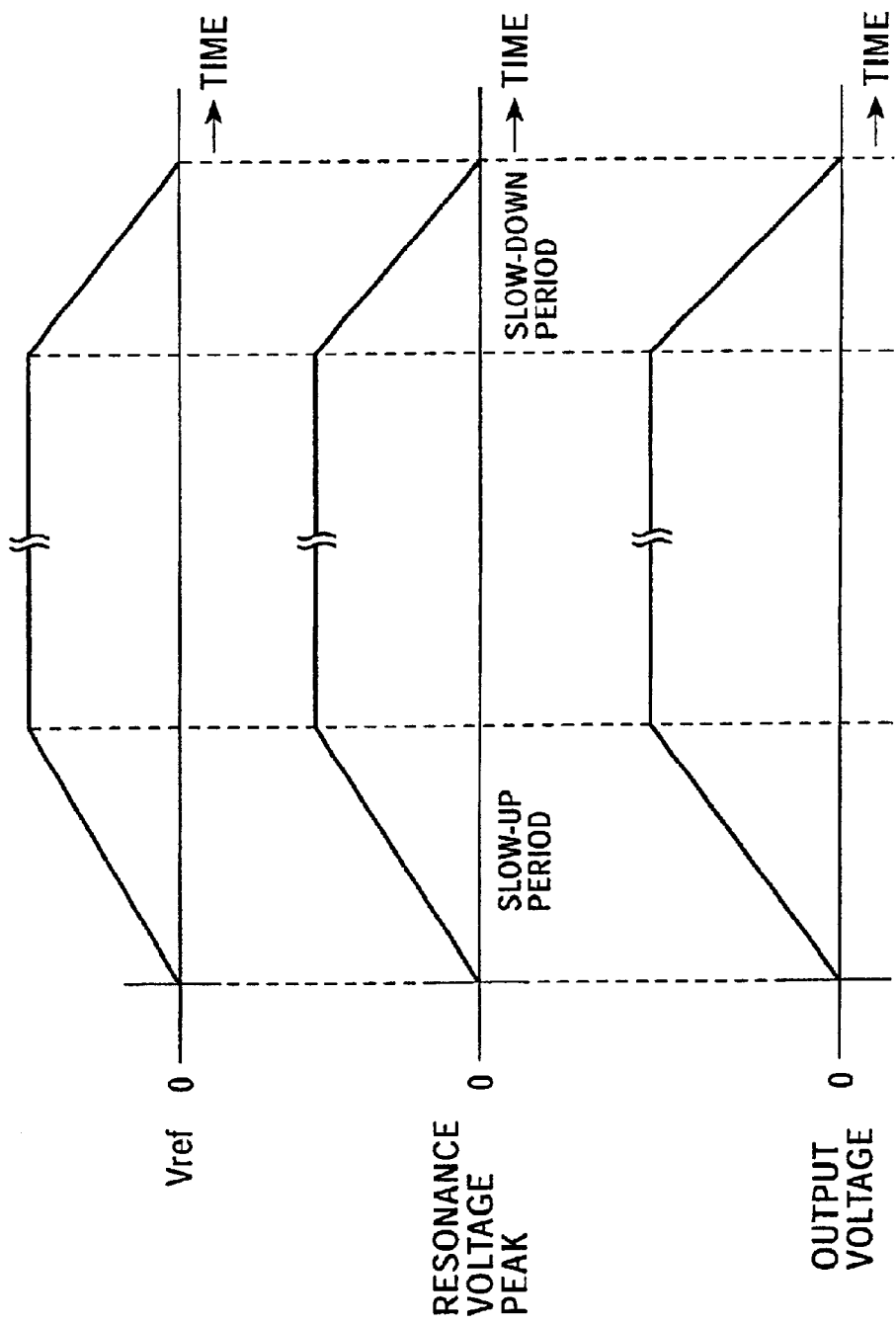
FIG. 9 is a waveform diagram showing an example of controlling a reference voltage of the current resonance type power supply unit.

In the current resonance type power supply unit 30 which can vary the output power in this manner, by dint of controlling the variable reference voltage source 32 through the control circuit 31, for example, as shown in FIG. 9, by varying the reference voltage Vref to raise the voltage Vref gradually to a first preset value at the time of start control, a so-called "soft start control" is performed. Also, at the time of stop control, the reference voltage Vref is lowered gradually to a second preset value, switching operation of the switching circuit 14 being stopped by means of the switching control circuit 19, thereby making it possible to perform a so-called "soft stop control".

In the current resonance type power supply unit 30, for protection of the constituent elements and as anti-flickering measures for the AC line, the soft start control and the soft stop control can be easily performed.

Further, in the current resonance type power supply unit 10 and the current resonance type power supply unit 20 of the above-mentioned configuration, the resonance voltage Vlo obtained at the connection point between the resonant capacitor 15C and the induction heating coil 100 is approximately proportional to the output power P, hence, detection of the resonance voltage Vlo makes it possible to apply the overload protection measure.

Fourth Embodiment

Figure 10:
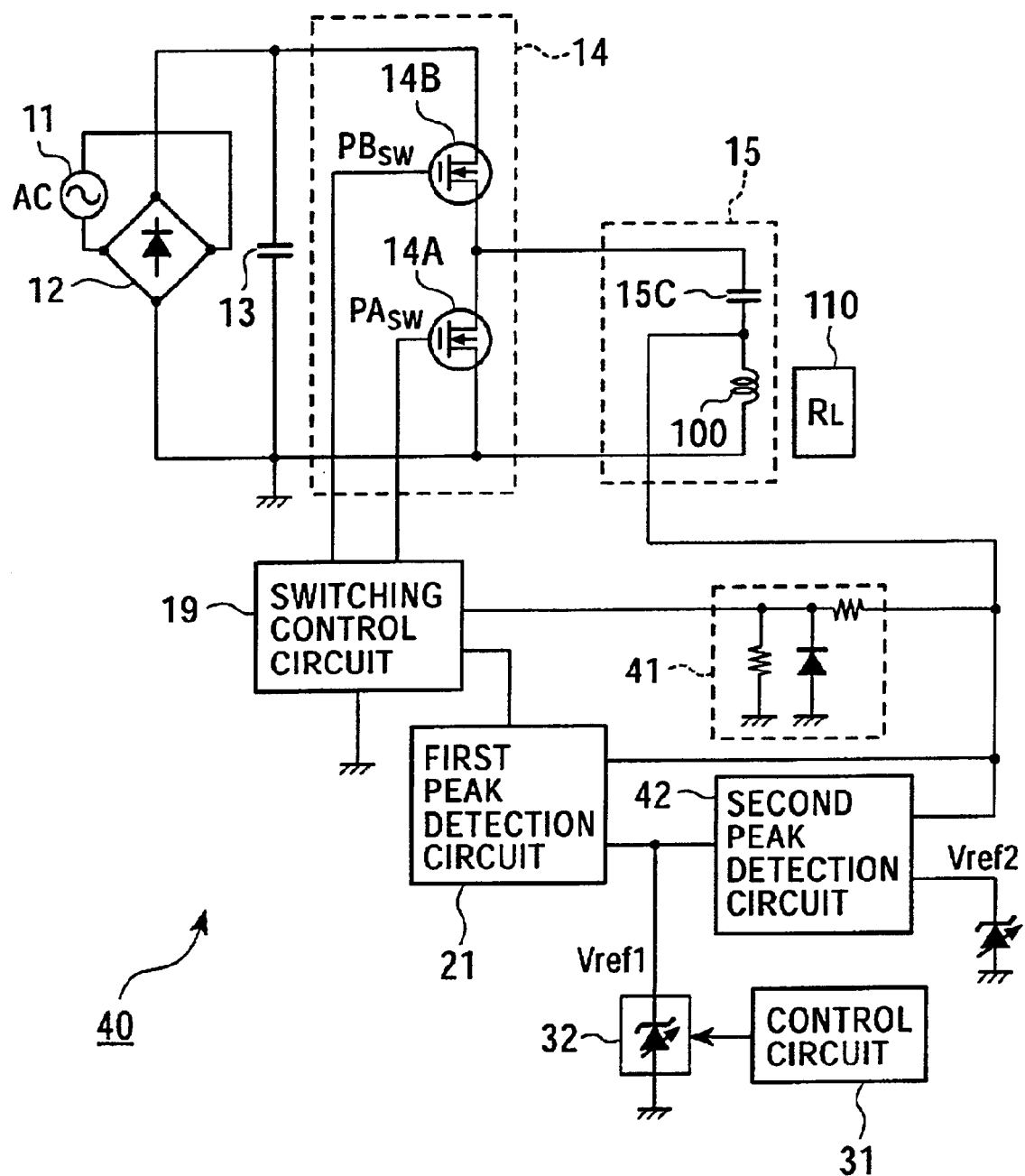
FIG. 10 is a block circuit diagram showing another configuration of the current resonance type power supply unit according to the present invention.

Namely, for example, referring to FIG. 10, there is shown a current resonance type power supply unit 40 according to a fourth embodiment, to which the overload protection measure has been applied. An over-voltage detection circuit 41 for detecting if the resonance voltage Vlo obtained at the connection point between the resonant capacitor 15C and the induction heating coil 100 should increase above a predetermined first prescribed voltage. The detection output of the over-voltage detection circuit 41 operates an un-illustrated latch circuit built in the switching control circuit 19, thereby stopping oscillation of the triangular wave generator 91 and ending the switching operation of the switching circuit 14. As a result, the continuation of the overload condition can be prevented and the switching elements 14A and 14B and the like can be protected.

Furthermore, in the current resonance type power supply unit 40 of the present embodiment, there is provided a second peak detection circuit 42 for detecting if the peak voltage Vpk of the resonance voltage Vlo should increase above a second prescribed value, whereas the detection output from the second peak detection circuit 42 is mixed in the reference voltage Vref of the first peak detection circuit 21 so that the reference voltage Vref of the first peak detection circuit 21 may be decreased if the peak voltage Vpk of the resonance voltage Vlo should rise above the second prescribed value, thus making it possible to keep the output power from exceeding a fixed level.

It should be noted that due to the characteristics of a feedback circuit of an arithmetic amplifier constituting the voltage comparator 18, the protection characteristics with respect to the above-mentioned overload condition may be freely set.

Fifth Embodiment

Figure 11:
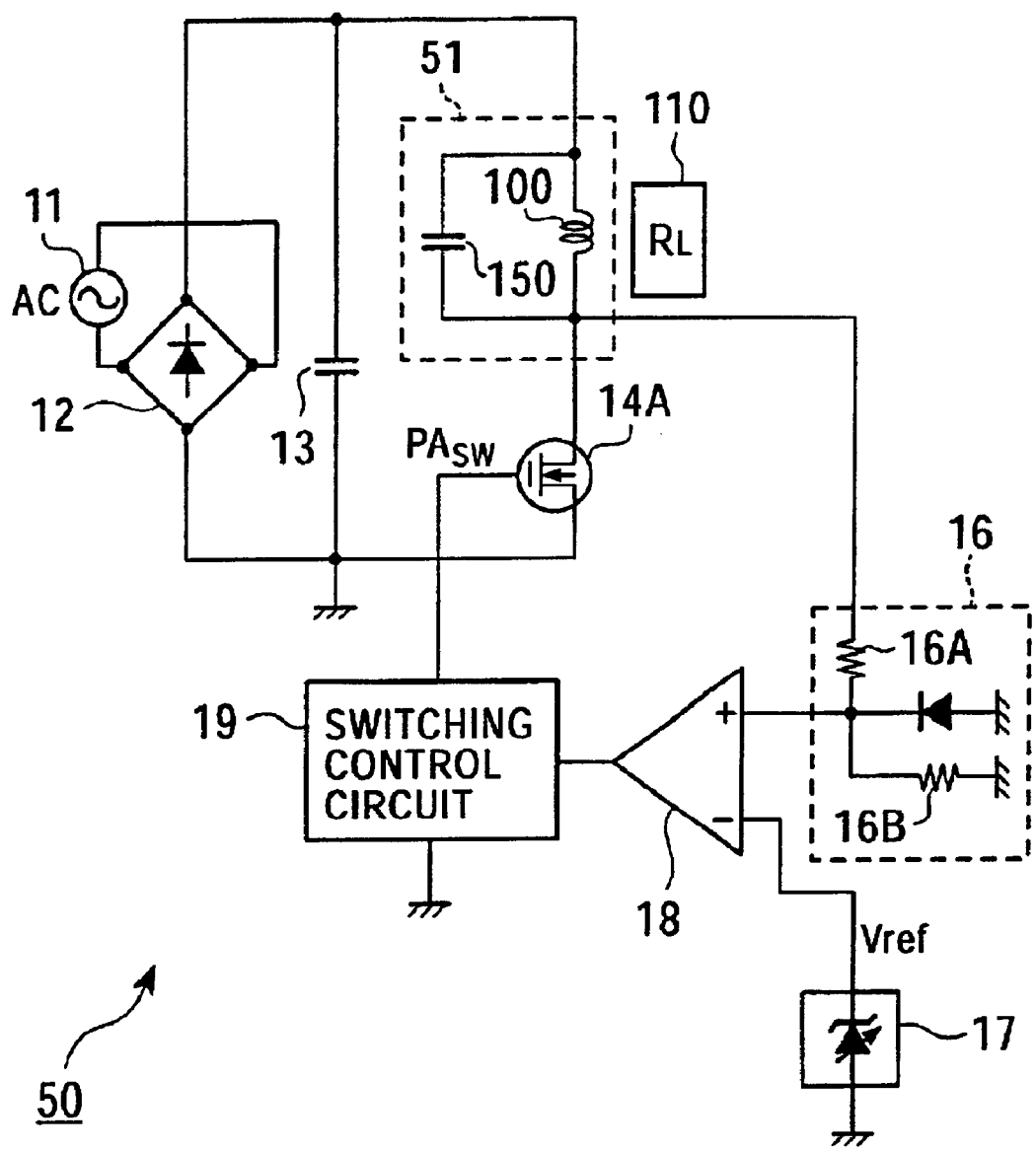
FIG. 11 is a block circuit diagram showing another configuration of the current resonance type power supply unit according to the present invention.

In the foregoing, as the preferred embodiments according to the present invention, the current resonance type power supply units 10, 20, 30, and 40 have been described. Nevertheless, the current resonance type power supply unit according to the present invention may very well be a current resonance type power supply unit 50 constituting a fifth embodiment as illustrated in FIG. 11. In the unit 50, a voltage resonance circuit 51 is formed by connecting in parallel the resonant capacitor 15C to the induction heating coil 100, in place of the current resonance circuit which is formed by connecting the resonant capacitor 15C in series to the induction heating coil 100.

In the current resonance type power supply unit 50, the voltage resonance circuit 51 formed by connecting the resonant capacitor 15C in parallel to the induction heating coil 100 is connected to the smoothing capacitor 13 in parallel while being in a condition of being connected in series to a switching element 52A constituting a switching circuit 52.

Further, the resonance voltage Vlo obtained at the connection point between the voltage resonance circuit 51 and the switching element 52A is designed to be supplied to the voltage comparator 18 via the resistance split circuit 16.

It should be noted that the current resonance type power supply unit 50 in FIG. 11 is a modification of the current resonance type power supply unit 10 shown in FIG. 1 above as the voltage resonance type, and that the same elements of configuration as the current resonance type power supply unit 10 described above are given the same reference characters in FIG. 11, the detailed explanation being omitted.

Furthermore, in each preferred embodiment described above, the present invention has been applied to the induction heating device which generates heat as a high frequency current is run into an induction heating coil 100 to give rise to an inductive current and heat in the body to be heated 110, which is placed in close proximity to the induction heating coil 100, so that the induction heating coil 100 is connected to the resonant capacitor 15C, thus forming the current resonance circuit 15 and the voltage resonance circuit 51.

Nonetheless, the present invention is not limited to the power source of the induction heating device but is applicable to the resonance power supply unit as a while. For example, a current resonance circuit or a voltage resonance circuit may be formed by connecting a primary coil of a power transmission transformer in a non-contact type power transmission circuit or the primary coil of a converter transformer in a DC-DC converter to a resonant capacitor.

Sixth Embodiment

Figure 12:
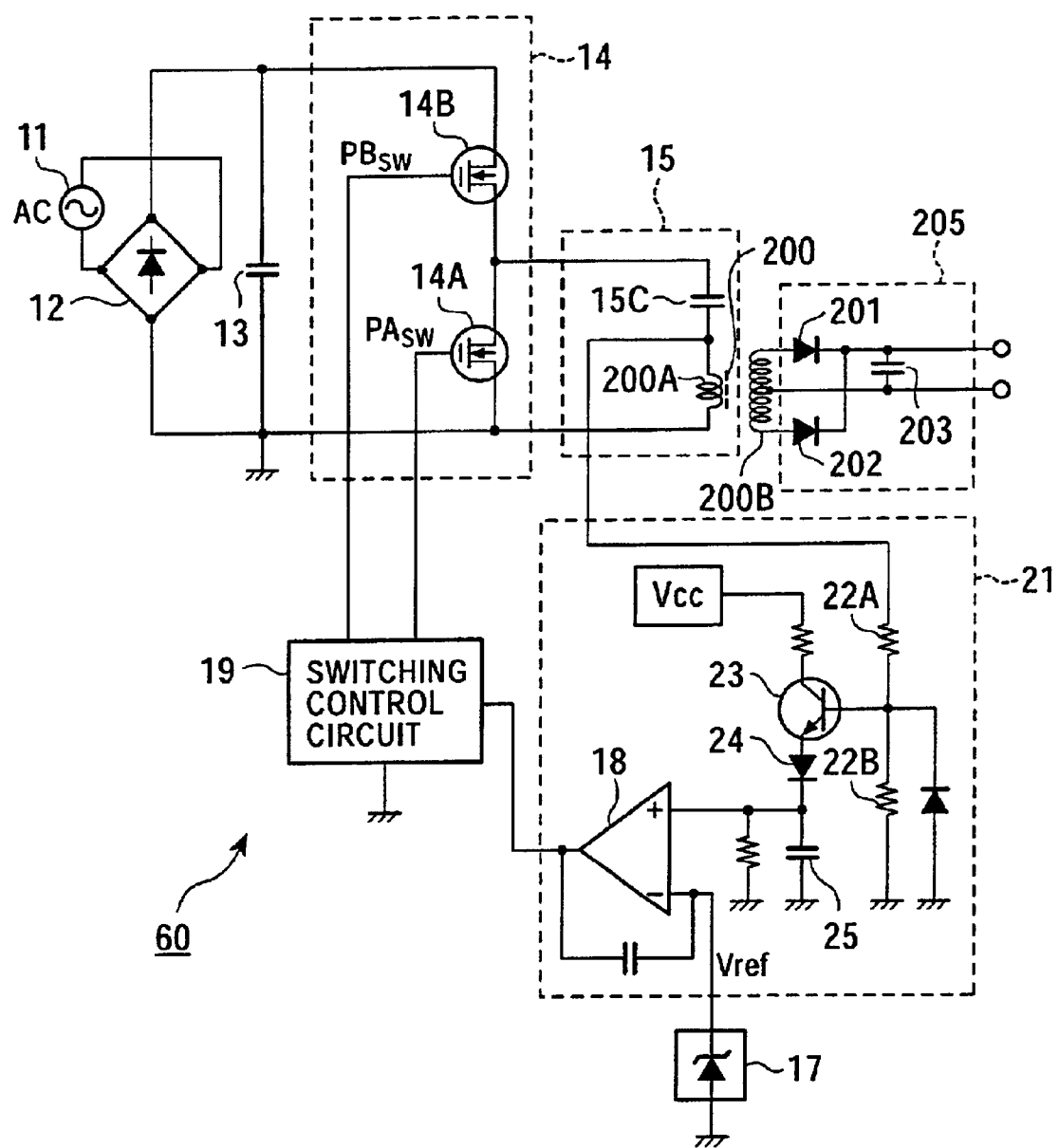
FIG. 12 is a block circuit diagram showing another configuration of the current resonance type power supply unit according to the present invention.

For instance, referring to FIG. 12, instead of the induction heating coil 100 in the current resonance type power supply unit 20 shown in FIG. 6 above, by connecting a primary coil 200A of a converter transformer 200 in a DC-DC converter to the resonant capacitor 15C to form a current resonance circuit, it is possible to provide a current resonance type power supply unit 60 according to a sixth embodiment which functions as the constant power regulated power supply.

In the current resonance type power supply unit 60, a rectifying/smoothing circuit 205 which comprises of rectifier diodes 201 and 202 and a smoothing capacitor 203 is connected to a secondary coil 200B of the above-mentioned converter transformer 200, and the DC constant power regulated power supply can be supplied via the rectifier and smoothing circuit 205 to the load.

It should be understood that the resonance type power supply unit of the present invention is not limited to the description of the preferred embodiments, inasmuch as the present invention is capable of other embodiments and of being practiced or carried out in various ways, and that it is intended to cover all changes and modifications of the examples of the invention herein chosen for the purposes of the disclosure.

What is claimed is:

1. A resonance type power supply unit having a switching circuit comprising an inductive element and a capacitive element and causing a current waveform or a voltage waveform to resonate, said unit comprising:

a resonance voltage detector for detecting a resonance voltage generated by said inductive element and said capacitive element;

a voltage converter for converting the resonance voltage detected by said resonance voltage detector to a comparable DC voltage;

a voltage comparator for comparing the DC voltage obtained by said voltage converter to a reference voltage;

a switching controller for controlling a switching frequency or an on-state time interval of said switching circuit to correspond to the reference voltage in accordance with comparison output by said voltage comparator; and a reference voltage controller for changing the reference voltage;

wherein said reference voltage controller gradually increases the reference voltage to a first preset value at a time of start control, and gradually decreases the reference voltage to a second preset value at a time of stop control; and wherein said switching controller stops switching in said switching circuit.

2. A resonance type power supply unit having a switching circuit comprising an inductive element and a capacitive element and causing a current waveform or a voltage waveform to resonate, said unit comprising:

a resonance voltage detector for detecting a resonance voltage generated by said inductive element and said capacitive element;

a voltage converter for converting the resonance voltage detected by said resonance voltage detector to a comparable DC voltage;

a voltage comparator for comparing the DC voltage obtained by said voltage converter to a reference voltage;

a switching controller for controlling a switching frequency or an on-state time interval of said switching circuit to correspond to the reference voltage in accordance with a comparison output by said voltage comparator;

a first overload protector for controlling said reference voltage controller to lower the reference voltage when the resonance voltage detected by said resonance voltage detector reaches a first predetermined value or more; and/or a second overload protector for controlling said switching controller to stop switching in said switching circuit when the resonance voltage detected by said resonance voltage detector reaches a second predetermined value or more.

3. The resonance type power supply unit according to claim 1, wherein said inductive element and said capacitive element are connected in parallel.

4. The resonance type power supply unit according to claim 1, wherein said inductive element and said capacitive element are connected in series.

5. The resonance type power supply unit according to claim 1, wherein said inductive element is an induction heating coil.

6. The resonance type power supply unit according to claim 1, wherein said inductive element is a primary coil of a transformer.

7. The resonance type power supply unit according to claim 1, wherein said inductive element is a primary coil of a non-contact type power transmission circuit.

8. The resonance type power supply unit according to claim 2, wherein said inductive element and said capacitive element are connected in parallel.

9. The resonance type power supply unit according to claim 2, wherein said inductive element and said capacitive element are connected in series.

10. The resonance type power supply unit according to claim 2, wherein said inductive element is an induction heating coil.

11. The resonance type power supply unit according to claim 2, wherein said inductive element is a primary coil of a transformer.

12. The resonance type power supply unit according to claim 2, wherein said inductive element is a primary coil of a non-contact type power transmission circuit.

* * * * *